United States Patent [19]

Ueno et al.

[11] 4,299,852

[45] Nov. 10, 1981

[54] PROCESS FOR THE PREPARATION OF BOTULINAL RESISTANT MEAT PRODUCTS

[75] Inventors: Ryuzo Ueno, Nishinomiya; Toshio Matsuda, Itami; Tatsuo Kanayama, Takarazuka; Kunihiko Tomiyasu; Yatsuka Fujita, both of Nishinomiya; Shigeo Inamine, Kobe, all of Japan

[73] Assignee: Kabushiki Kaishaveno Seiyakuoyo Kenkyojo, Osaka, Japan

[21] Appl. No.: 150,663

[22] Filed: May 16, 1980

[30] Foreign Application Priority Data

Sep. 12, 1979 [JP] Japan ................................ 54-116102

[51] Int. Cl.$^3$ ................................................ A23B 4/00
[52] U.S. Cl. .................................... 426/266; 426/332; 426/335; 426/641; 426/652
[58] Field of Search ............... 426/264, 265, 266, 332, 426/335, 641, 646, 652, 281

[56] References Cited

U.S. PATENT DOCUMENTS

| | | | |
|---|---|---|---|
| 3,099,566 | 7/1963 | Flesch et al. | 426/266 |
| 3,255,022 | 6/1966 | Hinkley et al. | 426/652 X |
| 3,595,679 | 7/1971 | Schoch et al. | 426/264 |
| 3,851,077 | 11/1974 | Stemmler et al. | 426/265 |
| 3,899,600 | 8/1975 | Sweet | 426/266 X |

FOREIGN PATENT DOCUMENTS

2713259  9/1977  Fed. Rep. of Germany ...... 426/264

OTHER PUBLICATIONS

Ivey et al., *Journal of Food Protection,* vol. 41, No. 8, pp. 621–625, 8–1978.

*Primary Examiner*—Arthur L. Corbin
*Attorney, Agent, or Firm*—Sherman & Shalloway

[57] ABSTRACT

A process for the preparation of botulinal-resistant meat products, which comprises adding to the starting meat sorbic acid or potassium sorbate, glycerol monoester of $C_{10}$- or $C_{12}$-fatty acid, and the minimum amount necessary, for the product's color development, of a nitrous acid compound; or a process for the preparation of botulinal-resistant meat products, which comprises adding to the starting meat sorbic acid or potassium sorbate, glycerol monoester of $C_{10}$- or $C_{12}$- fatty acid and sodium hexametaphosphate; or a process for the preparation of botulinal-resistant meat products, which comprises adding to the starting meat sorbic acid or potassium sorbate, glycerol monoester of $C_{10}$- or $C_{12}$-fatty acid, sodium hexametaphosphate and the minimum necessary amount, for the product's color development, of a nitrous acid compound.

13 Claims, No Drawings

PROCESS FOR THE PREPARATION OF BOTULINAL RESISTANT MEAT PRODUCTS

This invention relates to processes for the preparation of botulinal resistant meat products, which comprise adding to the starting meat materials sorbic acid or potassium sorbate, glycerol monoester or monoesters of $C_{10}$- and/or $C_{12}$-fatty acid or acids, a reduced amount of a nitrous acid compound and/or sodium hexametaphosphate.

"Meat products" as are used in the present application generally cover pork products, especially ham, bacon and various sausages. Of these, salted metal products contain as the salting agent table salt and nitrite (sodium or potassium salt). The nitrite is used as the salting agent for the following purposes: (1) inhibition of growth of food poisoning microorganisms, particularly *Clostridium botulinum*, (2) color stabilization of product (development and stabilization of pinkish color), (3) enrichment of flavor characteristics of salted meat, and (4) retardation of acidification.

According to the current practices in the United States, at least 120 ppm to the meat product, sometimes as much as 156 ppm, of nitrite is added for inhibiting the growth of *Clostridium botulinum*.

It is known, on the other hand, that the nitrous acid formed under decomposition of nitrate or nitrite reacts with basic secondary amine to produce nitrosoamine through the following procedure:

$$\begin{array}{c}CH_3\\ \diagdown\\ \diagup\\ CH_3\end{array}NH + HONO \longrightarrow \begin{array}{c}CH_3\\ \diagdown\\ \diagup\\ CH_3\end{array}N-NO + H_2O.$$

This nitrosoamine is a very strong carcinogen. Recent studies have also revealed that the nitrous acid itself is carcinogenic, and furthermore it can be a chemical mutagen in acidic environment. Consequently, the residual nitrite in the meat products must be reduced or eliminated, in order to avoid the dangers of nitrous acid in the human body. Thus the USDA has recommended for bacon the combined use of 40 ppm of nitrite and 0.2% of sorbic acid or 0.26% of potassium sorbate. This prescription, however, shows inferior effect to that of the presently adopted official prescription, i.e., 120–156 ppm of nitrite.

The most important function of the nitrite from the standpoint of food hygiene is its anti-botulinal activity. If no nitrite is added, the consumers will be exposed to the toxin produced by *Clostridium botulinum* contaminating the meat product.

Accordingly, the object of the present invention is to provide botulinal resistant meat products, through the discovery of a *C. botulinum*-inhibiting method which can replace the addition of nitrite.

We first selected substances which exhibited antibacterial activities against microorganisms other than *Clostridium botulinum*, particularly against Bacillus species which are spore-forming, and examined their antimicrobial activities against *Clostridium botulinum* species (Types A, B and E) by in vitro tests. The substances which had been found effective were kneaded into comminuted pork meat together with *Clostridium botulinum* spore, either singly or in various combinations, and heated at 75° C. for an hour. Thus three methods achieving excellent anti-botulinal effect were discovered.

The first method comprises the concurrent use of sorbic acid or potassium sorbate, a glycerol monoester or esters of a $C_{10}$- and/or $C_{12}$-fatty acid or acids, and a nitrous acid compound in the amount corresponding to the minimum amount of nitrite radical necessary for the color development of the meat product. With this method the toxin formation of *C. botulinum* can be retarded longer than the case of adding 156 ppm of sodium nitrite.

The second method comprises the concurrent use of sorbic acid or potassium sorbate, a glycerol monoester or monoesters of a $C_{10}$- and/or $C_{12}$-fatty acid or acids and sodium hexametaphosphate.

The third method comprises the concurrent use of sorbic acid or potassium sorbate, a glycerol monoester or esters of a $C_{10}$- and/or $C_{12}$-fatty acid or acids, sodium hexametaphosphate, and a nitrous acid compound in the amount corresponding to the minimum nitrite radical necessary for the color development of the product. This third method exhibits the best anti-botulinal effect of the three.

Thus according to the invention, the processes for the preparation of meat products exhibiting excellent resistance to *Clostridium botulinum* are provided, which comprise adding to the meat material, in the course of its processing, (1) sorbic acid or potassium sorbate, (2) a glycerol monoester or monoesters of a $C_{10}$- and/or $C_{12}$-fatty acid or acids, (3) a nitrous acid compound in the amount corresponding to the minimum nitrite radical necessary for the color development of the product, and/or (4) sodium hexametaphosphate.

According to the subject processes, (1) sorbic acid or potassium sorbate is added in an amount of 0.05–0.2% by weight to the meat.

The glycerol monoesters of $C_{10}$- and/or $C_{12}$-fatty acids as the component (2) are the compounds expressed by the formulae below:

$$\begin{array}{cc}CH_2OR & CH_2OH\\ | & |\\ CHOH \quad \text{or} & CHOR\\ | & |\\ CH_2OH & CH_2OH\end{array}$$

(in which R stands for the residual group of capric acid or lauric acid). These compounds are added, either singly or as a mixture of more than one compound, in the amount of 0.001–0.5% by weight to the meat.

The component (3), nitrous acid compound, may be nitrous acid, potassium nitrite and the like, preferably sodium nitrite. The minimum amount of nitrite radical ($NO_2^-$) necessary for the color development is not greater than 30 ppm, preferably 20–30 ppm. The named nitrous acid compound must be used in the amount sufficient to supply the nitrite radical of the above-specified amount. For example, 30 ppm of nitrite radical is given by 45 ppm of sodium nitrite.

The component (4), sodium hexametaphosphate, is used in the amount of 0.2–0.5% by weight of the starting meat material.

It has been reported in the literatures that glycerol monoesters of $C_{10}$–$C_{12}$-fatty acids show antimicrobial activity against bacteria in general. According to our studies, however, the glycerol monoester of $C_{10}$- or $C_{12}$-fatty acid shows no growth-inhibiting effect on *Clostridium botulinum*, in meat products, if used alone and at concentrations not detrimental to the taste of meat products. Furthermore, they are again ineffective when used concurrently with a minor amount of nitrous acid compound, for example, that of the amount corresponding to no more than 30 ppm of nitrite radical.

Sodium hexametaphosphate, which also is known to have antimicrobial activity, again is incapable of inhibiting toxin formation of *Clostridium botulinum* in meat products, if used alone or co-used with a minor amount of a nitrous acid compound, for example, that of the amount corresponding to no more than 30 ppm of nitrite radical.

Concurrent use of sodium hexametaphosphate and glycerol monoester of $C_{10}$- and/or $C_{12}$-fatty acid neither is effective in meat products.

Furthermore, potassium sorbate shows almost no effectiveness without the concurrent use of nitrite, although it is considerably effective if used with a nitrite as in the aforesaid USDA prescription.

It is indeed surprising, therefore, that the afore-specified processes of this invention using the compounds of each suitable amount, in suitable combination, effectively inhibit the growth of *Clostridium botulinum* in the meat products and prevent toxin formation, when none of the compounds show such effectiveness if used alone.

In the process of this invention, the aforesaid compounds (1), (2) and (3) and/or (4) can be added either separately or simultaneously, at any optional stage of preparation of the meat products. For example, with such cured products as bacon and ham, it is particularly preferred to mix the compounds into the ordinary curing agent. With the kneaded products such as sausages, the compounds are preferably used as mixed with the conventional seasoning agents and/or additives.

In the experiments carried out in connection with the subject invention, antimicrobial activity levels against *Clostridium botulinum* of various compounds were tested. The experimenting method will be given hereinafter by way of a reference, with the test results also being shown.

Reference

As the test organisms, the following three were used: *Clostridium botulinum* type A strain 190, *Clostridium botulinum* type B strain Lamanna, and *Clostridium botulinum* type E strain Iwanai. Each of the organisms was allowed to form spores in brain heart infusion (BHI) media. Thus thick spore suspensions were formed. Thereafter types A and B suspensions were heated at 80° C. for 20 minutes, and the type E suspension, at 60° C., for 15 minutes. These spore suspensions were stored at 2°–5° C.

The antimicrobial activities of the tested compounds were determined as follows. After inoculating the test organisms in BHI media (with the pH adjusted to 6.0), the first lot was left unheated, the second lot heated at 70° C. for 30 minutes, and the third heated at 80° C. for 30 minutes. Then the media were covered with liquid paraffin, cultured for 30 days at 30° C., and the effective concentrations for inhibiting the bacterial growth were calculated. The results are as shown in Table 1.

TABLE 1

| Treatment C. botulinum type Compound | no heating | | | 70° C. 30 min. heating | | | (unit used: μg/g) 80° C. 30 min. heating | | |
| --- | --- | --- | --- | --- | --- | --- | --- | --- | --- |
| | A | B | E | A | B | E | A | B | E |
| Sodium nitrite (NaNO$_2$) | 200 | 50 | 50 | 50 | 25 | 25 | 50 | 25 | 25 |
| sorbic acid* | 8000 | 8000 | 8000 | 8000 | 8000 | 8000 | 8000 | 8000 | 8000 |
| TSPP** | 8000< | 8000< | 8000< | 8000< | 8000< | 8000< | 8000< | 8000 | 8000 |
| STP** | 8000< | 8000 | 8000< | 8000 | 4000 | 8000 | 8000 | 4000 | 8000 |
| SHMP** | 8000 | 2000 | 4000 | 4000 | 2000 | 4000 | 2000 | 2000 | 2000 |
| MC$_8$** | 200 | 100 | 400 | 200 | 100 | 200 | 50 | 12.5 | 100 |
| MC$_{10}$** | 100 | 50 | 50 | 25 | 50 | 25 | 25 | 25 | 12.5 |
| MC$_{12}$** | 100 | <6.25 | <6.25 | <6.25 | <6.25 | <6.25 | <6.25 | <6.25 | <6.25 |
| (BHI media, pH: 6.0) | | | | | | | | | |

*Sorbic acid was added as potassium sorbate.
**TSPP: tetrasodium pyrophosphate
STP: sodium tripolyphosphate
SHMP: sodium hexametaphosphate
MC$_8$: monocaprylin
MC$_{10}$: monocaprin
MC$_{12}$: monolaurin The following observations were made from the results shown in Table 1.

The effective concentration for inhibiting *Clostridium botulinum* of sorbic acid was found to be 8000 ppm (80%) as to all three strain types in spite of such a low pH of the media as 6.0, TSPP and STP were substantially ineffective, even at the concentrations of 8000 ppm or higher. SHMP was recognized effective at 2000–4000 ppm (0.2–0.4%) in the heated test lots. As to the glycerol monoesters of fatty acids, the more the carbon number, the lower the effective concentration. Particularly MC$_{12}$ and MC$_{10}$ showed conspicuous effectiveness. Sodium nitrite inhibited the bacterial growth at 20–50 ppm in the heated test lots, showing strong effectiveness even used by itself. In conclusion, NaNO$_2$, MC$_{10}$, MC$_{12}$ and SHMP exhibited the growth-inhibiting action against *Clostridium botulinum* in the in vitro tests.

Then the effectiveness of those test compounds in meat products was examined, and the following surprising facts were discovered. The effective inhibiting concentration of sodium nitrite was 120–160 ppm, several times higher than that in the in vitro test. In contrast, although 0.1–0.2% of sorbic acid showed unsatisfactory *C. botulinum*-inhibiting effect when used alone, it exhibited excellent effect when used with no less than 40 ppm of NaNO$_2$, or with SHMP and/or MC$_{10}$ or MC$_{12}$.

Also a considerably large quantity of MC$_{10}$ or MC$_{12}$ was required to achieve the intended antimicrobial activity in meat products. When used alone, both of them were ineffective even at such a high concentration as 500 ppm (10–100 times that used with BHI media). When used concurrently with sorbic acid, or with SHMP or NaNO$_2$, either of them showed strong C. antibotulinal effect.

SHMP was ineffective at the concentration of 5000 ppm (0.5%), even when used concurrently with 40 ppm of NaNO$_2$, but when sorbic acid was used as the third component, it showed appreciable inhibiting action in the meat products. In those tests the pH of all lots was adjusted to 6.0. Therefore the above results have no relevancy with the pH-lowering effect of sorbic acid or SHMP.

As has been described above, the antimicrobial activities determined by in vitro tests differ greatly from those in the meat products. This is probably because *Clostridium botulinum* exhibits different drug sensitivity from that of other Bacillus species and Salmonella species.

Hereinafter the invention will be more specifically explained with reference to the following working examples. The examples given were each repeated several times, to confirm the reproducibility of test results. The percentages are by weight.

EXAMPLE 1

(Comminutes and Homogenized Pork Meat)

Following the method of Christiansen and Tompkin et al., fresh pork meat was minced (the mesh size, 3 m/m), and made into a uniform homogenate with a laboratory homogenizer (manufactured by Teraoka Co.), together with NaCl 2.5%, dextrose 0.5%, sodium erythorbate 0.055%, and the chemicals specified in Table 2. Further a mixed spore suspension containing equal number of *Clostridium botulinum* type A, type B and Type E spores was inoculated in the homogenate, at the inoculum size of $10^2$ spores per gram of the total weight of meat product, followed by a uniform mixing. The mixing time was 5 minutes in total. The amount of moisture content added was up to 3% of the total weight of the system.

Fifty (50) g each of the mixtures was packed with a vacuum-packing film, two packs each being prepared for one test lot. Incidentally, the inoculated spore suspension had been heated at 80° C. for 20 minutes, as done in the foregoing Reference.

As soon as the packs were filled, in all the test lots they were heated in a 70° C.-water bath for 60 minutes, (the meat in the pack being heated to 73° C.) and cooled rapidly. They were then stored in a thermostat of 27° C., and the number of days passed before the swelling started was recorded, because the swelling is caused by growth of *Clostridium botulinum.*

The number of days passed before the swelling first occurred was expressed as the preservation period. Also for demonstrating the fact that the subject processes show stronger antibotulinal effect than that of the official prescription, i.e., addition of 156 ppm of nitrite, the difference obtained by subtracting the preservation period by the official prescription from that of this Example is given as the increased preservation period, together with other data in Table 2 below.

TABLE 2

| Lot No. | $NaNO_2$ (μg/g) | Potassium sorbate (%) | $MC_{10}$ (%) | $MC_{12}$ (%) | SHMP (%) | pH of product | Preservation period (number of days) | Increased preservation period (number of days) |
|---|---|---|---|---|---|---|---|---|
| 1 | 0 | 0 | 0 | 0 | 0 | 5.95 | 5 | |
| 2 | 20 | 0 | 0 | 0 | 0 | 5.98 | 7 | |
| 3 | 30 | 0 | 0 | 0 | 0 | 6.00 | 7 | |
| 4 | 40 | 0 | 0 | 0 | 0 | 6.00 | 8 | |
| 5 | 156 | 0 | 0 | 0 | 0 | 6.00 | 16 | 0 |
| 6 | 0 | 0.26 | 0 | 0 | 0 | 6.02 | 7 | |
| 7 | 20 | 0.26 | 0 | 0 | 0 | 6.02 | 10 | |
| 8 | 30 | 0.26 | 0 | 0 | 0 | 6.03 | 10 | |
| 9 | 40 | 0.26 | 0 | 0 | 0 | 6.01 | 12 | |
| 10 | 30 | 0 | 0.05 | 0 | 0 | 6.00 | 8 | |
| 11 | 30 | 0 | 0 | 0.05 | 0 | 5.98 | 8 | |
| 12 | 30 | 0 | 0 | 0 | 0.5 | 5.98 | 8 | |
| 13 | 0 | 0.26 | 0.05 | 0 | 0 | 6.02 | 16 | 0 |
| 14 | 20 | 0.26 | 0.05 | 0 | 0 | 6.01 | 18 | 2 |
| 15 | 30 | 0.26 | 0.05 | 0 | 0 | 6.02 | 20 | 4 |
| 16 | 40 | 0.26 | 0.05 | 0 | 0 | 6.01 | 22 | 6 |
| 17 | 0 | 0.26 | 0 | 0.05 | 0 | 6.02 | 17 | 1 |
| 18 | 20 | 0.26 | 0 | 0.05 | 0 | 6.01 | 20 | 4 |
| 19 | 30 | 0.26 | 0 | 0.05 | 0 | 6.00 | 23 | 7 |
| 20 | 40 | 0.26 | 0 | 0.05 | 0 | 6.00 | 25 | 9 |
| 21 | 0 | 0.26 | 0 | 0 | 0.5 | 6.02 | 14 | |
| 22 | 20 | 0.26 | 0 | 0 | 0.5 | 6.00 | 15 | |
| 23 | 30 | 0.26 | 0 | 0 | 0.5 | 6.01 | 16 | 0 |
| 24 | 30 | 0 | 0.05 | 0 | 0.5 | 5.98 | 10 | |
| 25 | 30 | 0 | 0 | 0.05 | 0.5 | 5.98 | 12 | |
| 26 | 0 | 0.134 | 0.05 | 0 | 0.25 | 6.00 | 11 | |
| 27 | 20 | 0.134 | 0.05 | 0 | 0.25 | 6.00 | 16 | 0 |
| 28 | 30 | 0.134 | 0.05 | 0 | 0.25 | 6.01 | 19 | 3 |
| 29 | 0 | 0.134 | 0.05 | 0 | 0.5 | 5.98 | 15 | |
| 30 | 20 | 0.134 | 0.05 | 0 | 0.5 | 6.00 | 20 | 4 |
| 31 | 30 | 0.134 | 0.05 | 0 | 0.5 | 6.00 | 21 | 5 |
| 32 | 0 | 0.26 | 0.025 | 0 | 0.25 | 6.02 | 18 | 2 |
| 33 | 0 | 0.26 | 0.025 | 0 | 0.5 | 6.01 | 23 | 7 |
| 34 | 0 | 0.26 | 0.05 | 0 | 0.25 | 6.02 | 24 | 8 |
| 35 | 0 | 0.26 | 0.05 | 0 | 0.5 | 6.02 | 31 | 15 |
| 36 | 0 | 0.134 | 0 | 0.05 | 0.25 | 5.99 | 13 | |
| 37 | 20 | 0.134 | 0 | 0.05 | 0.25 | 6.00 | 18 | 2 |
| 38 | 30 | 0.134 | 0 | 0.05 | 0.25 | 6.01 | 21 | 5 |
| 39 | 0 | 0.134 | 0 | 0.05 | 0.5 | 6.00 | 16 | 0 |
| 40 | 20 | 0.134 | 0 | 0.05 | 0.5 | 6.00 | 24 | 8 |
| 41 | 30 | 0.134 | 0 | 0.05 | 0.5 | 6.01 | 24 | 8 |
| 42 | 0 | 0.26 | 0 | 0.025 | 0.25 | 6.02 | 20 | 4 |

TABLE 2-continued

| Lot No. | NaNO$_2$ (μg/g) | Potassium sorbate (%) | MC$_{10}$ (%) | MC$_{12}$ (%) | SHMP (%) | pH of product | Preservation period (number of days) | Increased preservation period (number of days) |
|---|---|---|---|---|---|---|---|---|
| 43 | 0 | 0.26 | 0 | 0.025 | 0.5 | 6.03 | 23 | 7 |
| 44 | 0 | 0.26 | 0 | 0.05 | 0.25 | 6.03 | 27 | 11 |
| 45 | 0 | 0.26 | 0 | 0.05 | 0.5 | 6.04 | 37 | 21 |
| 46 | 0 | 0.26 | 0.025 | 0.025 | 0.25 | 6.01 | 25 | 9 |
| 47 | 0 | 0.26 | 0.025 | 0.025 | 0.5 | 6.02 | 33 | 17 |
| 48 | 30 | 0.26 | 0.05 | 0 | 0.5 | 6.03 | 45< | 29< |
| 49 | 30 | 0.26 | 0 | 0.05 | 0.5 | 6.03 | 45< | 29< |

It can be understood from Table 2 that the subject processes produce strong Antibotulinal effect.

For reference, Table 2 is re-arranged to Table 3, wherein the lots are disposed by the order of their effectiveness. Also for comparison, the data of the control lot treated according to the official prescription, i.e., addition of 156 ppm of NaNO$_2$ (lot No. 5) and those of the lot treated by the prescription recommended for bacon by USDA (concurrent use of 40 ppm of NaNO$_2$ and 0.26% of potassium sorbate, lot No. 9) are given in Table 3. From Table 3, it can be understood that the USDA prescription has inferior effect to that of the official prescription.

TABLE 3

| Lot No. | NaNO$_2$ (μg/g) | Potassium sorbate (%) | MC$_{10}$ (%) | MC$_{12}$ (%) | SHMP (%) | Preservation period (number of days) | Increased preservation period (number of days) |
|---|---|---|---|---|---|---|---|
| 48 | 30 | 0.26 | 0.05 | 0 | 0.5 | 45< | 29< |
| 49 | 30 | 0.26 | 0 | 0.05 | 0.5 | 45< | 29< |
| 45 | 0 | 0.26 | 0 | 0.05 | 0.5 | 37 | 21 |
| 47 | 0 | 0.26 | 0.025 | 0.025 | 0.5 | 33 | 17 |
| 35 | 0 | 0.26 | 0.05 | 0 | 0.5 | 31 | 15 |
| 44 | 0 | 0.26 | 0 | 0.05 | 0.25 | 27 | 11 |
| 20 | 40 | 0.26 | 0 | 0.05 | 0 | 25 | 9 |
| 46 | 0 | 0.26 | 0.025 | 0.025 | 0.25 | 25 | 9 |
| 34 | 0 | 0.26 | 0.05 | 0 | 0.25 | 24 | 8 |
| 40 | 20 | 0.134 | 0 | 0.05 | 0.5 | 24 | 8 |
| 41 | 30 | 0.134 | 0 | 0.05 | 0.5 | 24 | 8 |
| 19 | 30 | 0.26 | 0 | 0.05 | 0 | 23 | 7 |
| 33 | 0 | 0.26 | 0.025 | 0 | 0.5 | 23 | 7 |
| 43 | 0 | 0.26 | 0 | 0.025 | 0.5 | 23 | 7 |
| 16 | 40 | 0.26 | 0.05 | 0 | 0 | 22 | 6 |
| 31 | 30 | 0.134 | 0.05 | 0 | 0.5 | 21 | 5 |
| 38 | 30 | 0.134 | 0 | 0.05 | 0.25 | 21 | 5 |
| 15 | 30 | 0.26 | 0.05 | 0 | 0 | 20 | 4 |
| 18 | 20 | 0.26 | 0 | 0.05 | 0 | 20 | 4 |
| 30 | 20 | 0.134 | 0.05 | 0 | 0.5 | 20 | 4 |
| 42 | 0 | 0.26 | 0 | 0.025 | 0.25 | 20 | 4 |
| 28 | 30 | 0.134 | 0.05 | 0 | 0.25 | 19 | 3 |
| 14 | 20 | 0.26 | 0.05 | 0 | 0 | 18 | 2 |
| 32 | 0 | 0.26 | 0.025 | 0 | 0.25 | 18 | 2 |
| 37 | 20 | 0.134 | 0 | 0.05 | 0.25 | 18 | 2 |
| 5 | 156 | 0 | 0 | 0 | 0 | 16 | 0 |
| 9 | 40 | 0.268 | 0 | 0 | 0 | 12 | −4 |

EXAMPLE 2
(Bacon)

As the starting meat material, approx. 4 kg of pork flank (approx. 30 cm.×50 cm×4-7 cm in size) was used. An aqueous solution containing 15% of table salt, 10% of sugar and 0.55% of sodium erythorbate was used as the basic salting liquid, into which sodium nitrite, potassium sorbate (Sok), lauryl monoglyceride (MC$_{12}$) or sodium hexametaphosphate (SHMP) of the amounts as specified for each lot in Table 4 were dissolved to make individual salting liquids. (The contents of those chemicals in the salting liquids were ten times those to be added to the meat.) Each salting liquid was injected into the meat with an injector, at a ratio of 10% to the latter. The meat blocks were then allowed to stand in 0°-2° C. refrigerator for a night to be salted, dried at 30°-50° C. for 3 hours, smoked at 50°-70° C. for 4-5 hours, and then cooled.

The thus obtained bacon blocks were sliced with a sterilized ham-slicer into 2.5-3 mm-thick slices, which were sampled at random and subjected to the various tests as follows.

pH Measurement:

Fifty (50) ml of water was added to 10 g of a sample and homogenized, pH of which was measured with a glass electrode pH meter.

Water content measurement:

Five (5) g of a sample was dried at 105° C. for 20 hours, and the resulting weight loss was made the water content.

Determination of nitrite radical (NO$_2^-$):

The NO$_2^-$ was determined by the procedures described in "Eisei Kensa Hō Chūkai" (Commentary on Hygienic Inspection Methods) pp. 194-195 (ed. by Japan Pharmacy Association, pub. by Kanahara Publishers Co.) (SHINN method).

Sensory test:

The sliced bacon was fried on a Teflon (polytetrafluoroethylene)-coated electric table roaster in airtightly closed state (the dial set at 180° C.). Each sample was evaluated first as to the odour, and then as to the taste. The results were expressed in five grades, the most favorable being given five points and the entirely inacceptable, one point. The average of the points given by ten panelists was given as the test result.

Anti-botulinal test:

Six slices each of the bacon (approx. 25 g) were packed with a vacuum-packing film, and into which $10^3$ spores/g of *C. botulinum* type A, type B, and type E strains were inoculated, by the method of Christiansen et al. (*Appl. Microbial.* 27, pp. 733-737, 1974) using sterilized beach sand as the spore-carrier. After uniformly inoculating the spores on the bacon in the pack, the pack was evacuated, and kept at 27° C. The swelling of the pack was observed, and the toxin formation therein was examined as below. Incidentally, ten test samples were used for each lot.

Forty (40) g of the test sample maintained at 27° C. as above and 40 ml of a phosphoric acid buffer solution (pH, 6.0) were homogenized, centrifuged at 10,000 rpm for 15 minutes, and the supernatant liquid was separated by filtration. The state of toxin formation was judged by the death or survival of the mouse (body weight, 15-20 g) into which 0.5 ml of the supernatant liquid was administered by an injection into its abdominal cavity. Also as an antitoxin neutralization test, the sample liquid heated at 80° C. for 20 minutes was similarly injected into the mouse.

The anti-botulinal activity level is indicated by the number of days passed before the swelling and toxin formation were first recognized.

The test results are collectively shown in Table 5.

TABLE 4

| Lot No. | Added Chemicals | | | |
|---|---|---|---|---|
| | NaNO$_2$ (ppm) | Sok* (%) | MC$_{12}$ (%) | SHMP (%) |
| 1 | 156 | — | — | — |
| 2 | 40 | 0.26 | — | — |
| 3 (this invention) | 30 | 0.20 | 0.05 | — |
| 4 | 30 | 0.20 | — | 0.5 |
| 5 (this invention) | 30 | 0.20 | 0.05 | 0.5 |

*potassium sorbate

As demonstrated by the data in Table 5, in the Lot Nos. 3 and 5 within the scope of this invention, occurrence of swelling and retarded and conspicuous toxin-inhibiting effect was observed, compared with the Lot Nos. 1, 2 and 4 which were treated by the conventional methods. It should be particularly noted, furthermore, that the toxin formation was observed in the conventionally treated products, before the swelling occurred. This is a serious problem for the future actions in food sanitation, because it has been believed that toxin is formed after putrefaction (swelling) has progressed. Our test results disclose, however, that the meat products prepared by the conventional processes are quite liable to produce toxin even before putrefaction progresses, i.e., even though no abnormality is observable with naked eye, and suggest the possibility of *C. botulinum*-poisoning by such foods.

EXAMPLE 3

(Sausage)

Minced lean meat of pork was used as the starting material. In each test lot 5 kg of the minced meat was mixed with 2.0% of table salt, 1.0% of sugar, 0.055% of sodium erythorbate, 0.5% of blended spice, 0.3% of smoke powder and 1.0% of sodium caseinate; and the chemicals of the amounts varied for each lot (Lot Nos. 1-6), cut for 10 minutes with a silent cutter, transferred into a stainless steel cake mix blender, and inoculated with the same *C. botulinum* spore suspension as used in Example 1 at a rate of $10^3$ spores/g, followed by 5 minutes' mixing. The mixture was then filled into a vinylidene chloride film tube (90 mm in outer diameter) (approx. 120 g/tube), heated for 60 minutes in 75° C. water and cooled rapidly in ice water.

The types of chemicals and the amounts added to the meat in Lot Nos. 1-5 were same as those in Example 2 (see Table 4). In Lot No. 6, 0.268% of Sok, 0.05% of MC$_{12}$ and 0.5% of SHMP were added.

Thus obtained *C. botulinum*-inoculated sausages were subjected to the pH measurement, water content measurement, NO$_2^-$-determination and antibotulinal test as described in Example 2.

The test results are as shown in Table 6. The data of Lot No. 6 prove that according to the present invention, antibotulinal stability can be improved over that of conventional products, without using nitrite.

TABLE 5

| Lot No. | pH | Water content (%) | Disagreeable taste or odour | Sensory evaluation | NO$_2^-$ - content (ppm) immediately after preparation | Antibotulinal stability (number of preserved days) | |
|---|---|---|---|---|---|---|---|
| | | | | | | swelling | toxin formation |
| 1 | 6.15 | 35.5 | none | 4.3 | 62.8 | 10 | 9 |
| 2 | 6.17 | 35.0 | none | 4.2 | 15.5 | 10 | 8 |
| 3 (this invention) | 6.15 | 36.2 | none | 4.3 | 13.0 | 13 | 14 |
| 4 | 6.08 | 35.8 | none | 4.3 | 11.4 | 11 | 9 |
| 5 (this invention) | 6.09 | 35.5 | none | 4.3 | 11.7 | 16 | 18 |

TABLE 6

| Lot. No. | pH | Water content (%) | NO$_2^-$ Determination (ppm) | | | | Antibotulinal stability (Number of preserved days) | |
|---|---|---|---|---|---|---|---|---|
| | | | Immediately after preparation | 5th day | 10th day | 15th day | swelling | toxin formation |
| 1 | 6.08 | 58.9 | 48.0 | 21.3 | — | — | 7 | 7 |
| 2 | 6.07 | 60.0 | 13.7 | 6.0 | — | — | 8 | 6 |
| 3 (this invention) | 6.07 | 60.1 | 11.5 | 7.2 | 1.9 | — | 11 | 10 |
| 4 | 6.00 | 59.4 | 10.7 | 6.4 | 1.6 | — | 9 | 7 |
| 5 (this invention) | 5.98 | 59.9 | 10.7 | 6.5 | 3.5 | 1.1 | 15 | 15 |
| 6 (this invention) | 5.99 | 60.2 | — | — | — | — | 10 | 9 |

EXAMPLE 4

(Roast Ham)

Into approx. 300 g of roast pork cut into blocks of same size, 10% of the salting liquid of the composition specified below was injected. To the curling liquid also $10^3$ spores/g of *C. botulinum* had been added in advance. The meat was then allowed to stand overnight to be cured. The salting liquid was an aqueous solution containing 20% of table salt, 10% of sugar, 0.55% of sodium erythorbate and 2% of smoke powder; and the chemicals varied for each lot. The contents of the added chemicals were each ten times their amounts to be added to the meat. The lot No., added chemicals and their amounts were same as those in Example 2 (see Table 4).

Then the cured meat was packed with the vacuum-packing film, boiled for 90 minutes at about 75° C., and cooled rapidly to provide roast ham.

The pH, water content and toxin formation by *C. botulinum* of the thus obtained roast ham (ten blocks per lot) were examined similarly as in Example 2.

The results were as shown in Table 7, from which it can be understood that the lots according to this invention exhibit excellent antibotulinal stability.

TABLE 7

| Lot No. | pH | Water content (%) | Toxin formation (number of preserved days) |
|---|---|---|---|
| 1 | 6.21 | 55.5 | 12 |
| 2 | 6.23 | 56.2 | 10 |
| 3 (this invention) | 6.23 | 55.9 | 19 |
| 4 | 6.16 | 55.7 | 11 |
| 5 (this invention) | 6.17 | 55.4 | 24 |

EXAMPLE 5

(Sausage)

In this Example, the significance of laurylmonoglyceride (MC$_{12}$) concentration was examined with sausage.

The sausage was prepared similar to Example 3, of which pH, water content and antibotulinal stability were examined similarly to Example 2.

The test results were as shown in Table 8, from which it can be understood that the concurrent use of as little as 0.005% of MC$_{12}$ shows substantial effect.

TABLE 8

| Lot No. | Added chemicals | | | pH | Water content (%) | Antibotulinal stability (number of preserved days) | |
|---|---|---|---|---|---|---|---|
| | NaNO$_2$ (ppm) | SoK (%) | MC$_{12}$ (%) | | | swelling | toxin formation |
| 1 | 156 | — | — | 6.08 | 63.7 | 9 | 7 |
| 2 | 40 | 0.26 | — | 6.12 | 65.2 | 9 | 7 |
| 3 | 40 | 0.26 | 0.001 | 6.09 | 64.5 | 9 | 7 |
| 4 | 40 | 0.26 | 0.005 | 6.10 | 63.4 | 13 | 11 |
| 5 | 40 | 0.26 | 0.01 | 6.12 | 63.8 | 15 | 13 |
| 6 | 40 | 0.26 | 0.02 | 6.09 | 64.6 | 17 | 15 |
| 7 | 40 | 0.26 | 0.04 | 6.10 | 65.5 | 20 | 17 |

We claim:

1. A process for the preparation of botulinal-resistant meat products, which comprises adding to the starting meat sorbic acid or potassium sorbate, at least one glycerol monoester of C$_{10}$- or C$_{12}$-fatty acid in a total amount which will not make the meat product unpalatable, and the minimum amount necessary, for the product's color development, of a nitrous acid compound.

2. The process of claim 1 which comprises adding to the starting meat, 0.05–0.2% of sorbic acid or potassium sorbate; 0.001–0.5% of at least one of said glycerol monoesters; and no more than 30 ppm of the nitrous acid compound, all amounts being based on the weight of the starting meat.

3. The processing according to claim 2, wherein from 20 to 30 ppm of the nitrous acid compound is added to the meat product, said nitrous acid compound being selected from the group consisting of nitrous acid, potassium nitrite, and sodium nitrite.

4. A process for the preparation of botulinal-resistant meat products, which comprises adding to the starting meat sorbic acid or potassium sorbate, at least one glycerol monoester of C$_{10}$- or C$_{12}$-fatty acid in a total amount which will not make the meat product unpalatable and sodium hexametaphosphate.

5. The process according to claim 4 which comprises adding to the starting meat 0.05–0.2% of sorbic acid or potassium sorbate; 0.001–0.5% of at least one of said glycerol monoesters and 0.2–0.5% of sodium hexametaphosphate, all amounts being based on the starting meat.

6. A process for the preparation of botulinal-resistant meat products, which comprises adding to the starting meat sorbic acid or potassium sorbate, at least one glycerol monoester of C$_{10}$- or C$_{12}$-fatty acid in a total amount which will not make the meat product unpalatable, sodium hexametaphosphate and the minimum necessary amount, for the product's color development, of a nitrous acid compound.

7. The process according to claim 6 which comprises adding to the starting meat 0.05-0.2% of sorbic acid or potassium sorbate; 0.001-0.5% by weight of at least one of said glycerol monoesters; 0.2-0.5% by weight of sodium hexametaphosphate; and no more than 30 ppm of the nitrous acid compound, all amounts being based on the starting meat.

8. The process according to claim 7 wherein from 20 to 30 ppm of nitrous acid compound is added, said nitrous acid compound being selected from the group consisting of nitrous acid, potassium nitrite and sodium nitrite.

9. The process according to any one of claims 1, 4 or 6, in which 0.05-0.2%, by weight of the starting meat, of sorbic acid or potassium sorbate is added.

10. The process according to any one of claims 1, 4 or 6, in which 0.001-0.5%, by weight of the starting meat, of the glycerol monoester is added.

11. The process according to any one of claims 1 or 6, in which no more than 30 ppm, by weight of the starting meat, of a nitrous acid compound is added.

12. The process according to claim 10, in which nitrous acid, potassium nitrite or sodium nitrite is used as the nitrous acid compound.

13. The process according to any one of claims 4 or 6, in which 0.2-0.5%, by weight of the starting meat, of sodium hexametaphosphate is added.

* * * * *

UNITED STATES PATENT AND TRADEMARK OFFICE
CERTIFICATE OF CORRECTION

PATENT NO. : 4,299,852
DATED : November 10, 1981
INVENTOR(S) : UENO, ET AL.

It is certified that error appears in the above—identified patent and that said Letters Patent is hereby corrected as shown below:

On The Title Page, Item (73), should read

-- Assignee: Kabushiki Kaisha Ueno Seiyaku Oyo Kenkyujo, Osaka, Japan --.

Signed and Sealed this

Thirtieth Day of March 1982

[SEAL]

Attest:

GERALD J. MOSSINGHOFF

Attesting Officer

Commissioner of Patents and Trademarks